US012651735B2

(12) United States Patent
Covey et al.

(10) Patent No.: US 12,651,735 B2
(45) Date of Patent: Jun. 9, 2026

(54) METHODS AND APPARATUS FOR WASHING SAMPLING PROBE FOR USE IN MASS SPECTROMETRY SYSTEMS

(71) Applicant: DH Technologies Development Pte. Ltd., Singapore (SG)

(72) Inventors: Thomas R. Covey, Newmarket (CA); Tim Haebe, Ingelheim Am Rhein (DE); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 356 days.

(21) Appl. No.: 18/275,342

(22) PCT Filed: Jan. 31, 2022

(86) PCT No.: PCT/IB2022/050831
§ 371 (c)(1),
(2) Date: Aug. 1, 2023

(87) PCT Pub. No.: WO2022/167917
PCT Pub. Date: Aug. 11, 2022

(65) Prior Publication Data

US 2024/0136168 A1 Apr. 25, 2024
US 2024/0234117 A9 Jul. 11, 2024

Related U.S. Application Data

(60) Provisional application No. 63/144,695, filed on Feb. 2, 2021.

(51) Int. Cl.
*H01J 49/04* (2006.01)
*H01J 49/24* (2006.01)

(52) U.S. Cl.
CPC .......... *H01J 49/0431* (2013.01); *H01J 49/24* (2013.01)

(58) Field of Classification Search
CPC .... H01J 49/0431; H01J 49/0404; H01J 49/24; H01J 49/0459
See application file for complete search history.

(56) References Cited

U.S. PATENT DOCUMENTS

2018/0158661 A1* 6/2018 Eberlin .............. A61B 10/0045
2018/0238922 A1* 8/2018 Gebauer ................. B01L 3/021
2019/0157060 A1* 5/2019 Datwani ............. H01J 49/0454
(Continued)

OTHER PUBLICATIONS

Anonymous:, "Submerge Definition & Meaning-Merriam Webster," Apr. 13, 2022, pp. 1-11; https://www.merriam-webster.com/dictionary/submerge.
(Continued)

*Primary Examiner* — David E Smith
(74) *Attorney, Agent, or Firm* — Lathrop GPM LLP; Malaika O. D. Tyson; Jason Kuchar

(57) ABSTRACT

Methods and systems for delivering a liquid sample to an ion source for the generation of ions and subsequent analysis by mass spectrometry are provided herein. In accordance with various aspects of the present teachings, MS-based systems and methods are provided in which an open port of a sampling probe for receiving a specimen may be exposed to washing solvent to wash the sampling probe while fluid within the sampling probe remains continuously flowing.

20 Claims, 5 Drawing Sheets

(56) References Cited

U.S. PATENT DOCUMENTS

| | | | | |
|---|---|---|---|---|
| 2019/0234837 | A1* | 8/2019 | Van Berkel ......... | H01J 49/0431 |
| 2021/0025910 | A1* | 1/2021 | Hofmann ........... | G01N 35/1065 |

OTHER PUBLICATIONS

International Search Report for International Application No. PCT/IB2022/050831 dated Apr. 26, 2022.

Written Opinion for International Application No. PCT/IB2022/050831 dated Apr. 26, 2022.

* cited by examiner

METHODS AND APPARATUS FOR WASHING SAMPLING PROBE FOR USE IN MASS SPECTROMETRY SYSTEMS

RELATED APPLICATIONS

This application is a 35 U.S.C. 371 national stage filing of International Application No. PCT/IB2022/050831, filed on Jan. 31, 2022, which claims priority to U.S. Provisional Application No. 63/144,695 filed on Feb. 2, 2021, and entitled "Methods and Apparatus for Washing Sampling Probe for Use in Mass Spectrometry Systems," which is incorporated herein by reference in its entirety.

FIELD

The present teachings generally relate to sampling interfaces for mass spectrometry systems, and more particularly to apparatus and methods for washing sampling probes.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of an analyte of interest. Such pre-analytical steps can include sampling (e.g., sample collection) and sample preparation (e.g., separation from the matrix, concentration, fractionation and, if necessary, derivatization). It has been estimated, for example, that more than 80% of the overall analytical process can be spent on sample collection and preparation in order to enable the analyte's detection via MS or to remove potential sources of interference contained within the sample matrix, while nonetheless increasing potential sources of dilution and/or error at each sample preparation stage.

Ideally, sample preparation and sample introduction techniques for MS should be fast, reliable, reproducible, inexpensive, and in some aspects, amenable to automation. By way of example, various ionization methods have been developed that can desorb/ionize analytes from condensed-phase samples with minimal sample handling. One example of an improved sample introduction technique is a sampling probe, such as an "open port" sampling interface (OPI), in which relatively unprocessed samples can be introduced into a continuous flowing solvent that is delivered to an ion source of a MS system, as described for example in an article entitled "An open port sampling interface for liquid introduction atmospheric pressure ionization mass spectrometry" of Van Berkel et al., published in *Rapid Communications in Mass Spectrometry,* 29(19), pp. 1749-1756 (2015), which is incorporated by reference in its entirety. Conventionally, the flow of samples from an OPI to a destination, such as the ion source of an MS system, results from a Venturi-effect created by a nebulizer gas, which surrounds and shapes the spray plume during discharge of the liquid sample from an electrospray ionization (ESI) source, thereby drawing the liquid sample from the OPI to the ESI source, for example. The sample flow-rate is dependent on the nebulizer gas flow (gas pressure, nozzle size), the position of the ESI electrode tip relative to ESI nozzle, and the flow resistance within the transfer conduit between the OPI and MS system (fluid viscosity, tubing length/ID, etc.).

However, the direct introduction of complex matrices to an OPI, which may contain high concentrations of proteins, salts, and other contaminants, can potentially reduce system robustness as a result of flow problems within the sampling interface and/or the transfer conduit between the OPI and MS system. By way of example, long transfer conduits can be susceptible to the entrapment of air bubbles and/or precipitation of contaminants within the transfer conduit, which may significantly increase flow resistance, especially during the use of a more viscous solvent (e.g. water). Such problems can reduce analytical performance resulting from longer delays in sample delivery with significant peak broadening. Also, incorrect alignment of the OPI with the sample source can result in the contamination of the sample flow and/or the OPI probe.

Accordingly, there remains a need for improved open port sampling interfaces and systems incorporating the same.

SUMMARY

Methods and systems for performing chemical analysis via an OPI-MS system having improved robustness and/or accuracy are provided herein, wherein the open port of the OPI is configured to be submerged within a washing solvent (e.g., between receiving different samples) so as to prevent the buildup of contaminants about the open port or within the OPI. In accordance with various aspects of the present teachings, a system for analyzing a chemical composition of a specimen is provided, the system comprising a sampling probe having an outer housing having an open end and a liquid supply conduit within the housing. The liquid supply conduit extends from an inlet end configured to be fluidly coupled to a capture liquid supply source to an outlet end configured to deliver capture liquid to a sampling space at the open end of the housing, wherein the sampling space comprises a liquid-air interface for receiving a specimen within the capture liquid in the sample space. A liquid exhaust conduit within the housing extends from an inlet end in fluid communication with said sampling space to an outlet end (e.g., configured to fluidly couple to an ion source for discharging capture liquid received at the inlet end of the liquid exhaust conduit into an ionization chamber in fluid communication with a sampling orifice of a mass spectrometer). The system may further comprise a wash station configured to be fluidly coupled to a washing solvent source, wherein the wash station is configured such that at least the open end of the sampling probe is submerged within the washing solvent provided by the washing solvent source while capture liquid is flowing through the liquid supply conduit and the liquid exhaust conduit.

The washing solvent may be a variety of compositions in accordance with various aspects of the present teachings. By way of example, the washing solvent and the capture liquid may comprise the same solvents or different solvents. In some example aspects, the washing solvent may comprise a combination of the capture liquid and formic acid. In various aspects, the washing solvent may comprise one or more of water, methanol, and formic acid, all by way of non-limiting example. In some aspects, the washing solvent can comprise an alkaline solution (e.g., ammonia, diluted ammonia), and optionally, be followed by an acidic washing solvent. For example, a first washing solvent comprising ammonia followed by a second washing solvent comprising formic acid may be effective to re-equilibrate one or more surfaces of the sampling probe and/or ion source. Additionally or alternatively, the capture liquid may comprise acetonitrile.

The wash station may have a variety of configurations for providing washing solvent into which at least the open end of the sampling probe may be submerged. For example, in some aspects, the wash station can be configured such that at least the open end of the sampling probe may be submerged within a flow of washing solvent. For example, the washing solvent may be configured to flow through the wash station in a direction substantially parallel to a central axis of the sampling probe (e.g., parallel with the flow of capture liquid through the liquid exhaust conduit). In some example aspects, the wash station may be configured to be disposed below the sampling probe during washing thereof such that the open end of the sampling probe is immersed in the flow of washing solvent while the capture liquid is flowing through the liquid supply conduit and the liquid exhaust conduit. In some related aspects, an actuator (e.g., a robotic arm, motorized stage) may be configured to selectively move at least one of the wash station and the sampling probe relative to the other to provide for submersion of the open end of the sampling probe while the capture liquid is flowing through the liquid supply conduit and the liquid exhaust conduit. In such aspects, the continuous flow of liquid within liquid exhaust conduit may be effective to also transport washing solvent therethrough to clean inner surfaces of the sampling probe, for example. Moreover, the continuous flow of capture liquid and/or washing solvent through the liquid exhaust conduit may prevent air bubbles from being transmitted to the ion source.

Sampling probes in accordance with the present teachings can have a variety of configurations. For example, in some aspects, the sampling probe can comprise an inner capillary tube at least partially disposed within the outer housing, wherein said inner capillary tube defines one of the liquid supply conduit and the liquid exhaust conduit, and wherein a space between an outer wall of the inner capillary tube and an inner wall of the outer housing defines the other of the liquid supply and exhaust conduits. In some related aspects, for example, the outer housing can also comprise an outer capillary tube extending from a proximal end to a distal end adjacent to the sampling space. In various aspects, the inner and outer capillary tube can be coaxial. Additionally or alternatively, a distal end of the inner capillary tube can be recessed relative to the distal end of the outer housing.

In accordance with the present teachings, the sampling space can be configured to receive a variety of specimens within the liquid contained therein. For example, the specimen can comprise a fluid droplet (e.g., dropped/propelled onto the liquid/air interface) or a sample substrate. By way of example, the sample substrate can have one or more analytes adsorbed thereto, and wherein the liquid supply source comprises desorption solvent configured to desorb the one or more analytes from the sample substrate.

As detailed below, the system can comprise one or more of the ion source probe, the ionization chamber, and the mass spectrometer system, wherein the ion source probe is in fluid communication with the outlet end of the sample conduit and comprises a terminal end disposed in the ionization chamber, wherein analytes contained within said sample mixture are configured to ionize as the sample mixture is discharged into the ionization chamber.

Methods for performing chemical analysis are also provided herein. In accordance with various aspects of the present teachings, a method for performing chemical analysis of a specimen can comprise receiving the specimen within capture liquid at an open end of a sampling probe, said sampling probe comprising: an outer housing defining the open end; a liquid supply conduit within the housing, the liquid supply conduit extending from an inlet end configured to be fluidly coupled to a capture liquid supply source to an outlet end configured to deliver the capture liquid to a sampling space at the open end of the housing, wherein the sampling space comprises a liquid-air interface for receiving the specimen; and a liquid exhaust conduit within the housing, the liquid exhaust conduit extending from an inlet end in fluid communication with said sampling space to an outlet end. The method may further comprise delivering the capture liquid from the sampling space to the outlet end of the liquid exhaust conduit and submerging the open end of the sampling probe within the washing solvent in a wash station while the capture liquid is flowing through the liquid supply conduit and the liquid exhaust conduit.

In various aspects, methods in accordance with the present teachings may further comprise fluidly coupling the outlet end of the liquid exhaust conduit with a chemical analyzer. By way of non-limiting example, the outlet end of the liquid exhaust conduit may be fluidly coupled to an ion source for discharging capture liquid received at the inlet end of the liquid exhaust conduit into an ionization chamber in fluid communication with a sampling orifice of a mass spectrometer. In such aspects, the method may further comprise transporting the capture fluid from the sampling space to an ion source via the liquid exhaust conduit and discharging the capture liquid into an ionization chamber in fluid communication with a sampling orifice of a mass spectrometer.

In various aspects, submerging the open end of the sampling probe may comprise dipping the sampling probe into the washing solvent. By way of example, the wash station may be disposed below the sampling probe during washing thereof. In various aspects, the method may comprise moving at least one of the wash station and the sampling probe relative to the other.

The specimen received within the sampling space can have a variety of configurations but generally comprises one or more analytes of interest. By way of example, the specimen can comprise a fluid droplet containing or suspected of containing the one or more analytes of interest (e.g., following one or more pre-treatment or purification steps). Alternatively, the specimen can be a sample substrate (e.g., a SPME substrate) having one or more analytes adsorbed thereto, and the liquid supply source can provide a desorption solvent such that insertion of the specimen into the desorption solvent within the sampling space is effective to desorb the one or more analytes from the sample substrate.

In various aspects, the sampling probe can comprise an inner capillary tube at least partially disposed within the outer housing, wherein said inner capillary tube defines one of the supply conduit and the exhaust conduit and a space between an outer wall of the inner capillary tube and an inner wall of the outer housing defines the other of the supply conduit and the exhaust conduit. In some related example aspects, the outer housing can comprise an outer capillary tube extending from a proximal end to a distal end adjacent to the sampling space. In various aspects, a distal end of the inner capillary tube is recessed relative to the distal end of the outer housing.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

Figure 1A:
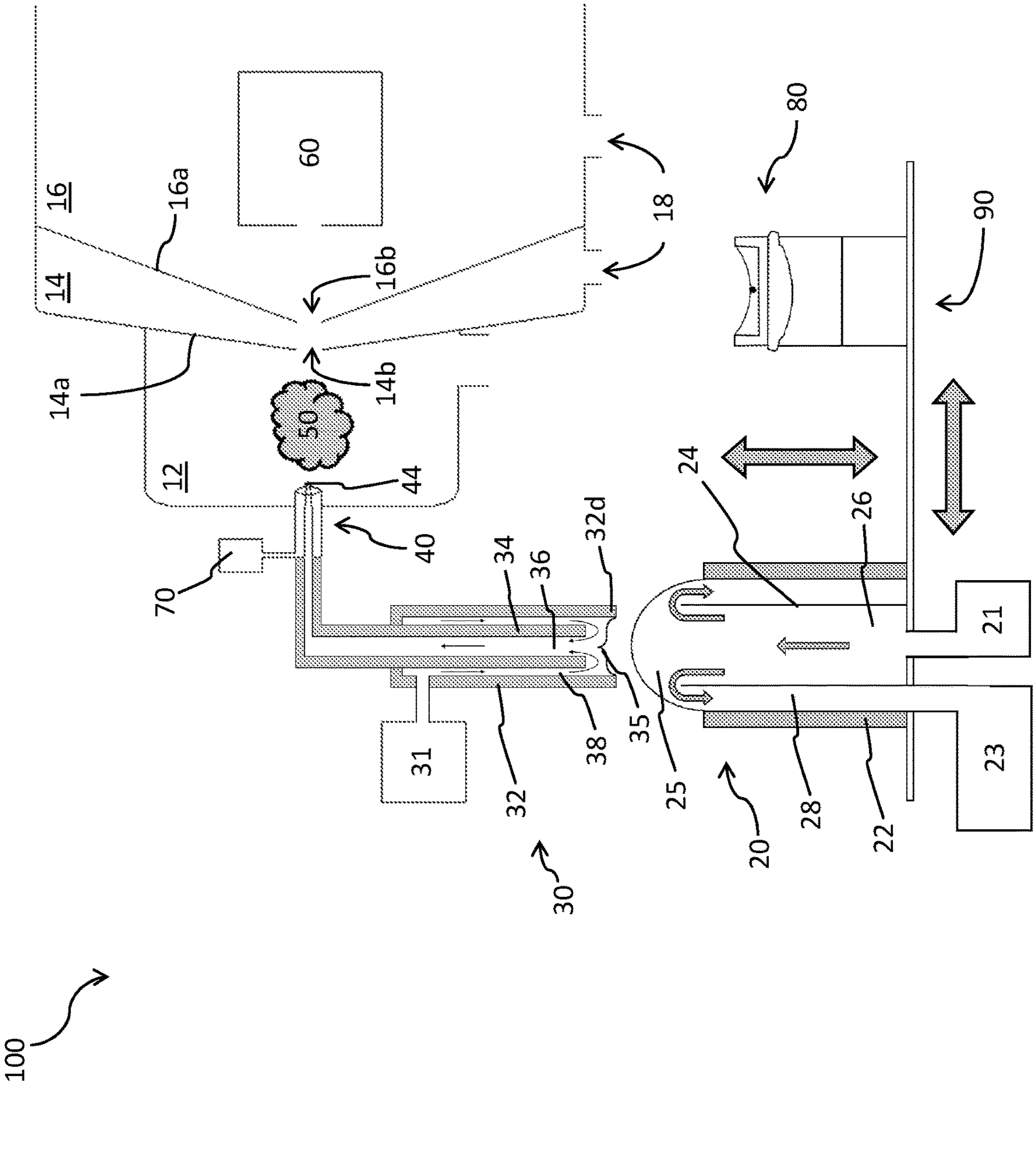
FIG. 1A, in a schematic diagram, illustrates an exemplary system comprising a sampling probe fluidly coupled to an electrospray ion source of a mass spectrometer system and a wash station for washing of the sampling probe in accordance with various aspects of the applicant's teachings.

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially" as used herein means 10% greater or lesser than the value or range of values stated or the complete condition or state. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

The present teachings are generally directed to methods and systems for performing chemical analysis with an OPI probe, wherein the open port of the OPI is configured to be submerged within a washing solvent, for example, between receiving different samples within the capture liquid within the OPI's open port. In certain aspects, the open port may be submerged within a washing solvent while fluid within the probe remains continuously flowing, thereby enabling the washing solvent to be transmitted therethrough to clean inner surfaces of the sampling probe, for example. Moreover, by maintaining a continuous flow of capture liquid and/or washing solvent through the sampling probe, aspiration of air and/or the formation of air bubbles within the sampling probe can be reduced. In various aspects, the methods and exemplified herein may prevent cross-contamination between the analytes in the different samples and/or the buildup of contaminants about the open port or within the OPI, thereby increasing the robustness, sensitivity, and/or accuracy of the chemical analysis performed in accordance with the present teachings. Additionally, in various aspects, the systems and methods described herein can enable fully- or partially-automated workflows, thereby increasing throughput while eliminating sources of error in the sequential analysis of a plurality of samples received within the sampling interface of the OPI.

Figure 1B:
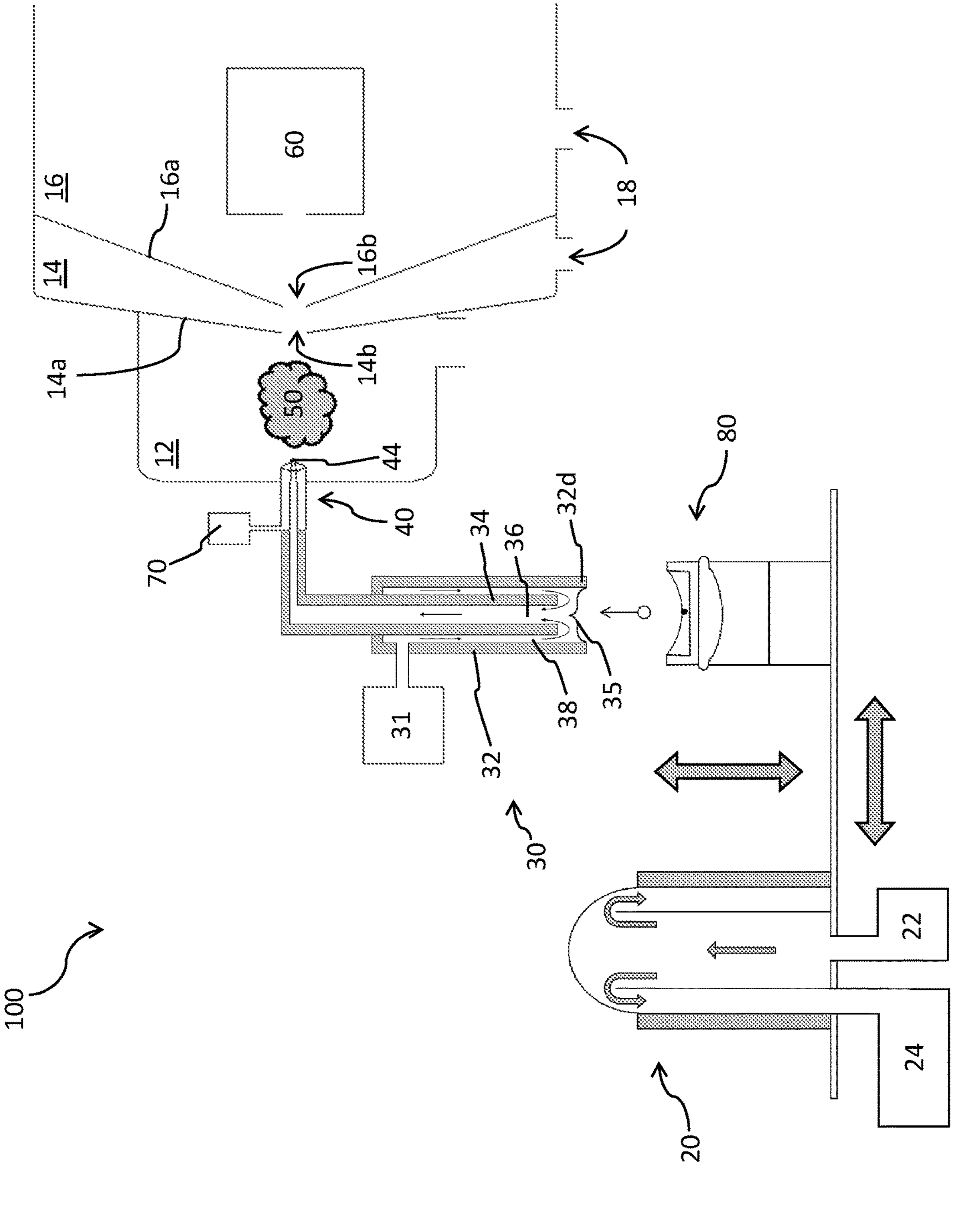
FIG. 1B, in a schematic diagram, illustrates the system of FIG. 1A with a specimen delivery system aligned with the sampling probe in accordance with various aspects of the applicant's teachings.

FIGS. 1A and 1B schematically depicts an embodiment of an exemplary system 100 in accordance with various aspects of the applicant's teachings for ionizing and mass analyzing analytes from a specimen received through a liquid/air interface of a sampling probe. As shown, the system 100 generally includes a sampling probe 30 (e.g., an open-port interface (OPI)) in fluid communication with an ion source 40 for discharging a liquid containing one or more sample analytes into an ionization chamber 12 (e.g., via electrospray electrode 44), and a mass analyzer 60 in fluid communication with the ionization chamber 12 for downstream processing and/or detection of ions generated by the ion source 40. In addition, the system 100 includes an acoustic droplet ejection device 80 for providing a specimen to the sampling probe 80 and a wash station 20 configured to provide a flow of washing solvent within which at least a portion of the sampling probe 30 can be submerged.

As shown in FIGS. 1A and 1B, the sampling probe 30 generally comprises an outer housing 32 (e.g., capillary tube) having an end 32*d* that is open to the atmosphere and through which a specimen comprising one or more analytes of interest can be received. A liquid supply conduit 38 within the outer housing 32 extends from an inlet end configured to be coupled to a capture liquid supply source 31 to an outlet end configured to deliver capture liquid from the liquid supply source 31 to the open end 32*d*. The example housing 32 also includes a liquid exhaust conduit 36 (e.g., an inner capillary tube) that extends from a sampling space 35 having a liquid/air interface adjacent the open end 32*d* to an outlet end such that capture liquid containing the analytes can be transported from a sampling space the open end 32*d* within the housing 32 to the ion source 40. Though the example sampling probe 30 of FIGS. 1A and 1B includes an inner, liquid exhaust conduit 36 disposed co-axially within the liquid supply conduit 38, it will be appreciated in light of the present teachings that the arrangement of the liquid supply conduit 38 and the liquid exhaust conduit 36 can be varied. For example, though the liquid exhaust conduit 36 is depicted as being surrounded by the liquid supply conduit 38, the liquid exhaust conduit 36 can in some aspects instead be disposed around the liquid supply conduit 38. In addition, in various aspects, the supply and exhaust conduits 38, 36 can have a variety of other relative orientations (e.g., side-by-side, end-to-end), but are generally configured that the outlet end of the supply conduit 38 and the inlet end of the exhaust conduit 36 deliver liquid to and remove liquid from, respectively, a sampling space at the open end 32*d* of the sampling probe 30.

The capture liquid provided to the sampling space 35 via the liquid supply conduit 38 can be any suitable liquid amenable to the ionization process, including water, methanol, and acetonitrile, and mixtures thereof, all by way of non-limiting examples. Though FIG. 1B depicts the specimen being delivered to the capture liquid within the sampling space 35 of the sampling probe 30 via an acoustic droplet ejection device 80, the specimen can be in any form capable of being delivered to the sampling space 35. By way of example, the specimen can comprise a sample substrate (e.g., a SPME substrate) to which analytes are adsorbed and which can be inserted into the capture liquid, wherein the capture liquid is a desorption solvent effective to desorb analytes from the sample substrate. The capture liquid supply source 31 can be any suitable source (e.g., a container, reservoir, etc.) and a pumping mechanism (not shown) can be provided to pump the liquid from the source 31 to the open end 32*d* via the liquid supply conduit 38 at a selected volumetric flow rate. Example pumping mechanisms include HPLC pumps, reciprocating pumps, positive displacement pumps such as rotary, gear, plunger, piston, peristaltic, diaphragm pump, and other pumps such as gravity, impulse and centrifugal pumps, all by way of non-limiting example.

The ion source 40 can have a variety of configurations but is generally configured to generate ions from analyte(s) contained within the capture liquid received via the liquid exhaust conduit 36, which may be directly or indirectly fluidly coupled to the ion source 40 via one or more fluid coupling mechanisms (e.g., couplers, conduits, tubes, valves). In the exemplary embodiment depicted in FIGS. 1A and 1B, an electrospray electrode 44, which can comprise a capillary fluidly coupled to the liquid exhaust conduit 34 extending from the sampling space 35, terminates in an outlet end that at least partially extends into the ionization chamber 12 and discharges the capture liquid therein. As will be appreciated by a person skilled in the art, the outlet end of the electrospray electrode 44 can atomize, aerosolize, nebulize, or otherwise discharge (e.g., spray with a nozzle) the capture liquid into the ionization chamber 12 to form a sample plume 50 comprising a plurality of micro-droplets generally directed toward (e.g., in the vicinity of) the curtain plate aperture 14*b* and vacuum chamber sampling orifice 16*b*. As is known in the art, analytes contained within the micro-droplets can be ionized (i.e., charged) by the ion source 40, for example, as the sample plume 50 is generated. By way of non-limiting example, the outlet end of the electrospray electrode 44 can be made of a conductive material and electrically coupled to a pole of a voltage source (not shown), while the other pole of the voltage source can be grounded. Micro-droplets contained within the sample plume 50 can thus be charged by the voltage applied to the outlet end such that as the liquid within the droplets evaporates during desolvation in the ionization chamber 12 bare charged analyte ions are released and drawn toward and through the apertures 14*b*, 16*b* and focused (e.g., via one or more ion lens) into the mass analyzer 60. Though the ion source probe is generally described herein as an electrospray electrode 44, it should be appreciated that any number of different ionization techniques known in the art for ionizing liquid samples and modified in accordance with the present teachings can be utilized as the ion source 40. By way of non-limiting example, the ion source 40 can be an electrospray ionization device, a nebulizer assisted electrospray device, a chemical ionization device, a nebulizer assisted atomization device, a photoionization device, a laser ionization device, a thermospray ionization device, or a sonic spray ionization device.

The ionization chamber 12 can be maintained at about atmospheric pressure, though in some embodiments, the ionization chamber 12 can be evacuated to a pressure lower than atmospheric pressure. The ionization chamber 12, within which analytes within the sample mixture that is discharged from the electrospray electrode 44 can be ionized, is separated from a gas curtain chamber 14 by a plate 14*a* having a curtain plate aperture 14*b*. As shown, a vacuum chamber 16, which houses the mass analyzer 60, is separated from the curtain chamber 14 by a plate 16*a* having a vacuum chamber sampling orifice 16*b*. The curtain chamber 14 and vacuum chamber 16 can be maintained at a selected pressure (s) (e.g., the same or different sub-atmospheric pressures, a pressure lower than the ionization chamber) by evacuation through one or more vacuum pump ports 18.

It will also be appreciated by a person skilled in the art and in light of the teachings herein that the mass analyzer 60 can have a variety of configurations. Generally, the mass analyzer 60 is configured to process (e.g., filter, sort, dissociate, detect, etc.) sample ions generated by the ion source 40. By way of non-limiting example, the mass analyzer 60 can be a triple quadrupole mass spectrometer, or any other mass analyzer known in the art and modified in accordance with the teachings herein. It will further be appreciated that any number of additional elements can be included in the mass spectrometer system including, for example, an ion mobility spectrometer (e.g., a differential mobility spectrometer) that is configured to separate ions, for example, based on their mobility differences at high- and low-field strength through a drift gas rather than the ions' mass-to-charge ratio. Additionally, it will be appreciated that the mass analyzer 60 can comprise a detector that can detect the ions which pass through the analyzer 60 and can, for example, supply a signal indicative of the number of ions per second that are detected.

As noted above, a specimen containing or suspected of containing the analytes of interest may be delivered to the sampling space 35 of the sampling probe 30 in a variety of manners, whether presently known in the art or hereafter developed. However, as shown in FIGS. 1A and 1B, the depicted exemplary system 100 includes an acoustic droplet ejection device 80, which can eject one or more droplets from the surface of an analyte-containing fluid upwards toward and into the air/liquid interface at the open end 32*d* of the sampling probe. Exemplary acoustic ejection devices and methods for loading the sampling probe 30 in accordance with various aspects of the present teachings are described, for example, in U.S. Pat. No. 10,770,277, entitled "System and Method for the Acoustic Loading of an Analytical Instrument Using a Continuous Flow Sampling Probe," the teachings of which are hereby incorporated by reference in its entirety. While FIG. 1B depicts the sampling probe 30 and acoustic droplet ejection device 80 in an exemplary orientation in which the acoustic droplet ejection device 80 is disposed directly beneath the sampling space 35 of the sampling probe 30, the direction of specimen delivery via the acoustic droplet ejection device 80 or another specimen delivery device may performed in other orientations relative to gravity. For example, it will be appreciated in light of the present teachings that the specimen may be provided to the open end 32*d* of the sampling probe utilizing gravity such as drops from a pipette disposed above the sampling space 35. Indeed, it will be appreciated that the sampling probe 30 may generally be maintained in a vertical orientation (with the sampling space at the bottom as depicted in FIGS. 1A and 1B or with the sampling space at the top), in a horizontal orientation, or in an angled orientation.

As noted above, the example system 100 includes a wash station 20 for cleaning the sampling probe 30. It will be appreciated that a wash station in accordance with the present teachings can have a variety of configurations in accordance with the present teachings, but is generally configured to expose at least the open end 32*d* of the sampling probe 30 to the washing solvent. In certain aspects, the open port can be submerged within the washing solvent while capture fluid within the sampling probe 30 remains continuously flowing through the liquid exhaust conduit 38 and/or liquid supply conduit 36, thereby maintaining a continuous flow of capture liquid and/or washing solvent through the sampling probe 30. Such exposure to the washing solvent, whether via spray (e.g., via a nozzle), immersion (e.g., within a flowing bath), or otherwise, may be effective to prevent cross-contamination and/or prevent the buildup of contaminants about the open end 32*d* of the sampling probe 30 or within the sampling probe (e.g., within the sampling space 35 or liquid exhaust conduit 36), thereby increasing the robustness, sensitivity, and/or accuracy of the devices and methods for performing chemical analysis of the specimens. For example, a person skilled in the art will appreciate that exposing the open end 32*d* of the sampling probe 30 to the flow of washing solvent between consecutive introductions of a plurality of specimens may prevent the analytes of one specimen from being transmitted to the ion source 40 and being analyzed and/or interfering with a subsequent specimen. Likewise, exposing the open end 32*d* of the sampling probe 30 to the flow of washing solvent between consecutive introductions of a plurality of specimens may be effective to aspirate the washing solvent through the liquid exhaust conduit 36, thereby dissolving or otherwise preventing precipitate or other contaminants from clogging the sampling probe 30 or ion source 40, which can cause errors in the chemical analysis and/or require the system to be taken off-line to remove the contaminants, for example. Moreover, by maintaining a continuous flow of capture liquid and/or washing solvent through the sampling probe 30 while washing the sampling probe 30 within the wash station 20, the present teachings can prevent the aspiration of air and/or the formation of air bubbles within the sampling probe, which can be detrimental to the operation of the ion source 40.

As shown in FIG. 1A, the example washing station 20 comprises an outer housing 22 having an end 22*d* that is open to the atmosphere and an inner housing 24 fluidly coupled to a washing solvent source 21. In the example washing station, the distal end 24*d* of the inner housing extends beyond the end 22*d* such that washing solvent that flows through the supply conduit 26 defined by the inner housing 24, over the distal end 24*d*, and into the annular space between the inner wall of the outer housing 22 and the outer wall of the inner housing 24 (e.g., waste conduit 28). Washing solvent can then be collected for disposal or recycling, for example. As shown, the washing solvent is collected by waste reservoir 23 via the waste conduit 28. The washing solvent source 21 can be any suitable source (e.g., a container, reservoir, etc.) and a pumping mechanism (not shown) can be provided to pump the washing solvent from the source 21 to the washing volume at the distal end of the washing station 20 at a selected volumetric flow rate. Example pumping mechanisms include HPLC pumps, reciprocating pumps, positive displacement pumps such as rotary, gear, plunger, piston, peristaltic, diaphragm pump, and other pumps such as gravity, impulse and centrifugal pumps, all by way of non-limiting example.

The washing solvent can comprise a variety of compositions in accordance with various aspects of the present teachings, and can be the same or different from the capture liquid. In various aspects, the washing solvent may comprise one or more of water, methanol, and formic acid, all by way of non-limiting example. For example, in some aspects, the washing solvent may comprise a combination of the capture liquid and formic acid. Alternatively, the washing solvent can comprise an alkaline solution (e g, ammonia, diluted ammonia) though in some aspects an alkaline washing solvent may first be provided, followed by an acidic solution such as a solution comprising formic acid (e.g., from a second washing solvent source (not shown)). In such aspects, the series of washes may be effective to re-equilibrate one or more surfaces of the sampling probe and/or ion source.

The example washing station 20 can have a variety of dimensions but generally provides a volume of fluid 25 within which the open end 32*d* of the sampling probe 30 can be submerged within the washing solvent. By way of example, the inner housing 24 may be sized and shaped to receive the open end 32*d* of the outer housing 32 of the sampling probe 30 within the supply conduit 26 such that washing solvent may continue to flow up and around the inner housing 24 before being directed to the waste reservoir 23. In some alternative aspects, the inner housing 24 may have a cross-sectional area that is less than the cross-sectional area of the open end 32, though the flow rate of the washing solvent may be controlled that due to cohesion, for example, the wash station 20 provides a convex liquid/air interface through which the open end 32*d* may be immersed. Moreover, though the example washing station 20 of FIG. 1A includes an inner housing 24 disposed co-axially within the waste conduit 28 and configured to receive washing solvent from the source 21 prior to entering the washing volume 25, it will be appreciated in light of the present teachings that the arrangement of the supply conduit 26 and the waste conduit 28 can be varied. For example, the supply conduit 26 may deliver waste solvent to a basin comprising the wash volume within which the sampling probe 30 may be at least partially submerged, with the waste conduit 28 effective to drain the basin so as to continually refresh the washing solvent to which the sampling probe 30 is exposed. By way of example, depending on the configuration of the wash station 20, a pump (not shown) may be provided to transport the washing solvent to the waste reservoir 23. As shown in FIG. 1A, however, the supply conduit 26 is disposed vertically beneath the sampling probe 30 such that the waste washing solvent flows downward from sampling space 25 into the waste conduit 28 after contacting the sampling probe 30. Moreover, as indicated by the upward arrow in the supply conduit 26 of FIG. 1A, in some aspects, the washing solvent is configured to flow through the wash station 20 in a direction substantially parallel to a central axis of the sampling probe 30. In this example flow configuration, washing solvent may be more easily aspirated into the open end 32*d* of the sampling probe submerged within the washing volume 25 such that not only are the submerged external surfaces of the sampling probe cleaned by the washing solvent, but additionally washing solvent may be transported through the liquid exhaust conduit 36 to dissolve or otherwise dislodge any contaminants between the sampling space 35 and the ion source 40.

In various aspects, the systems and methods described herein can enable fully- or partially-automated workflows, thereby increasing throughput while eliminating sources of error in the sequential analysis of a plurality of samples received within the sampling interface of the OPI. By way of example, with reference now to both FIGS. 1A and 1B, the system 100 additionally includes an actuator 90 that enables the sampling probe 30 and washing station 20/acoustic droplet ejection device 80 to move relative to one another in order to alternatively position the elements of the system 100 for washing or receiving specimens, respectively. It will be appreciated that the actuator 90 can comprise a variety of actuation mechanisms (e.g., robotic arm, stage, electromechanical translator, step motor, etc.) that are configured to move the washing station 20 or acoustic droplet ejection device 80. As shown comparing FIGS. 1A and 1B, for example, the actuator 90 may comprise a stage that may be translated horizontally to align one of the washing station 20 or acoustic droplet ejection device 80 with the sampling probe 30 as indicated by the horizontal double-headed arrows, as well as raise or lower the washing station 20 or acoustic droplet ejection device 90 (e.g., to submerge the probe 30 within the wash volume 25) or the acoustic droplet ejection device 80 to a suitable position such that the ejected droplets can be received within the sampling space 35 of the sampling probe 30. By way of example, when the washing station 20 is aligned with the sampling probe 30 as in FIG. 1A, the actuator 90 may raise the washing station 20 such that the open end 32*d* of the sampling probe is below the level of the liquid/air interface of the wash volume 35 (it will be appreciated that an actuator may alternatively lower the sampling probe 30). Upon washing the sampling probe (e.g., immersing the open end 32*d* for a sufficient time to remove contaminants on external surfaces of the sampling probe 30 and/or flushing the sampling probe 30), the actuator 90 may retract the wash station 20 and horizontally align the specimen delivery mechanism. As shown in FIG. 1B, for example, the acoustic droplet ejection device 80 may be positioned below the sampling probe 30 and then may be raised or lowered such that the surface of the analyte-containing fluid in the acoustic droplet ejection device 80 is spaced apart a suitable distance to eject a droplet upwards toward and into the air/liquid interface at the open end 32*d* of the sampling probe 30. By way of non-limiting example, the gap between the surface of the analyte-containing fluid in the acoustic droplet ejection device 80 and the air/liquid interface at the open end 32*d* can be as small as a few droplet diameters, or it may be significantly larger insofar as droplets can travel upwards quite far relative to their size as described in U.S. Published Application 2019/00157060 discussed above. For example, for 2.5 nL droplets having a droplet diameter of about 170 microns, the gap may range from about 300 μm to about 30 mm, about 200 times the droplet diameter. Following delivery of the specimen by the acoustic droplet ejection device 80, the actuator 80 may reposition the wash station 20 to wash the sampling probe 30 to prevent cross-contamination with future specimens, for example.

Though actuator 90 is shown in FIGS. 1A and 1B as providing movement of both the wash station 20 and the acoustic droplet ejection device 20, it will be appreciated that relative movement of the various elements may be controlled by independent actuators. By way of example, with reference now to FIGS. 2A-C, another exemplary system 200 in accordance with the present teachings is depicted. System 200 is substantially similar to system 100 of FIGS. 1A and 1B, though the specimen (in this case a SPME substrate 280 having analytes absorbed thereto) may move independently of the wash station 220. By way of example, the SPME substrate 280 may be manually inserted within the sampling space 235 of probe 230 or may be automatically moved, for example, under the control of a robotic arm (not shown). Alternatively, for example, a plurality of SPME substrates may extend from a specimen stage, with an actuator (e.g., a robotic arm, stage, etc.) being configured to iteratively insert a desired SPME substrate into the open end of the sampling probe. Exemplary SPME devices suitable for use in accordance with various aspects of the present teachings are described, for example, in U.S. Pat. No. 5,691,205, entitled "Method and Devise for Solid Phase Microextraction and Desorption" and PCT Pub. No. WO2015188282 entitled "A Probe for Extraction of Molecules of Interest from a Sample," the teachings of which are hereby incorporated by reference in their entireties.

Figure 2A:
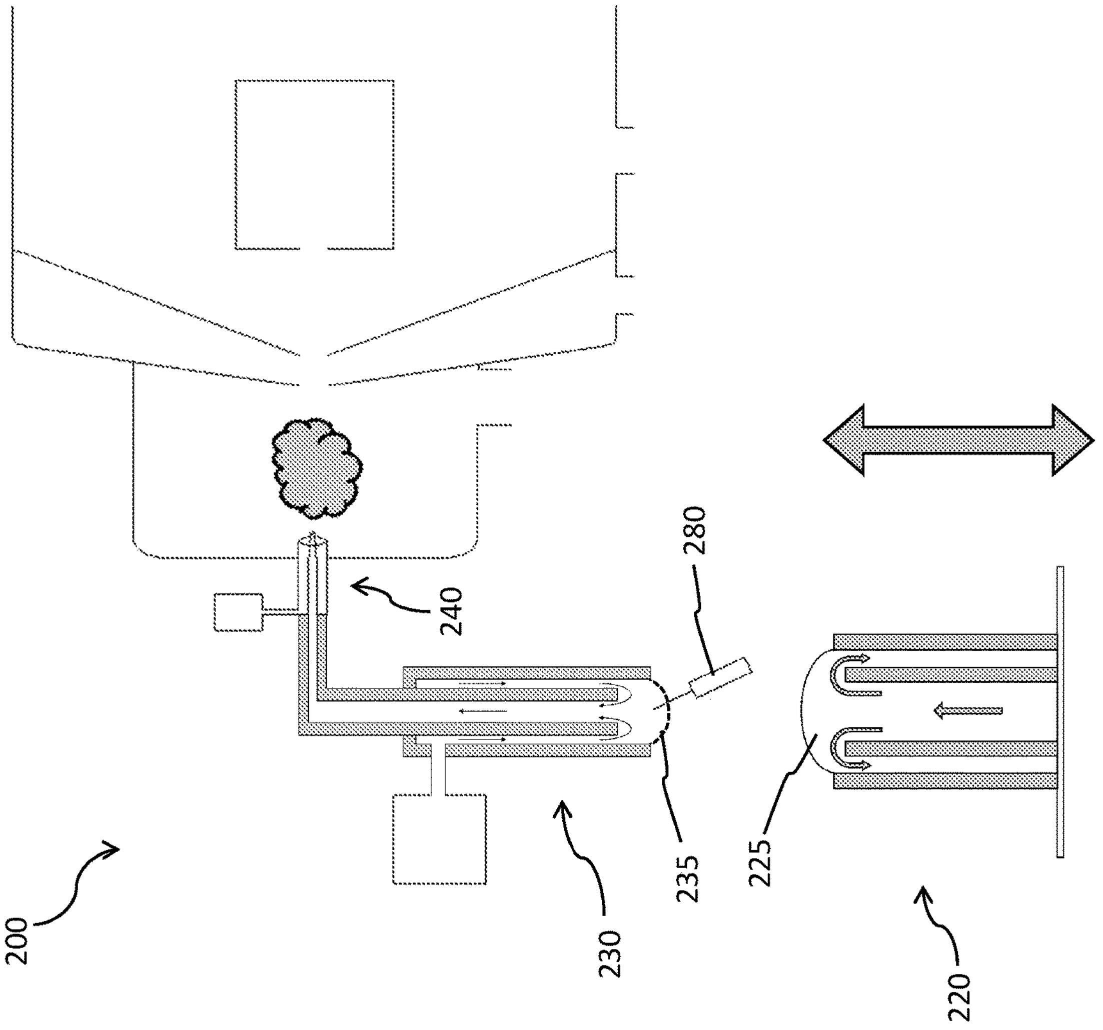
FIG. 2A, in a schematic diagram, illustrates another exemplary system in accordance with various aspects of the applicant's teachings.
Figure 2B:
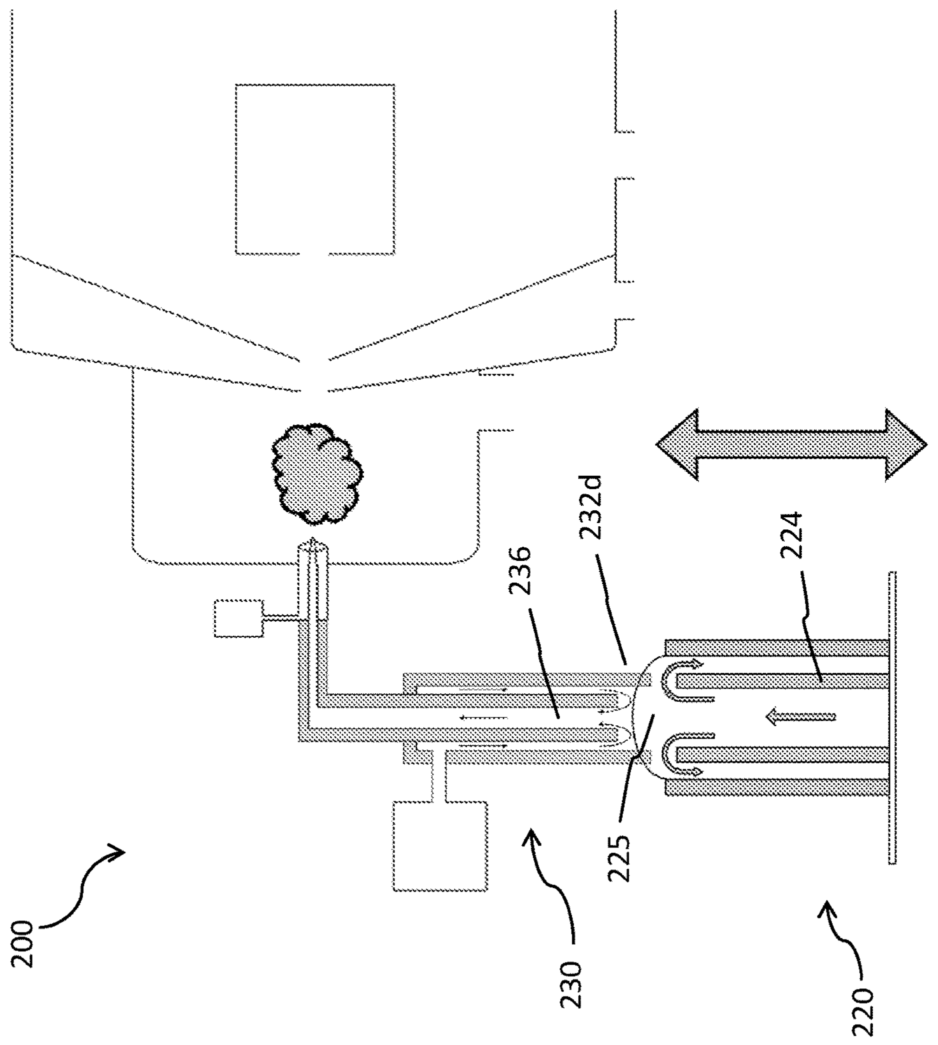
FIG. 2B, in a schematic diagram, illustrates the system of FIG. 2A in which the wash station is moved to a washing position.
Figure 2C:
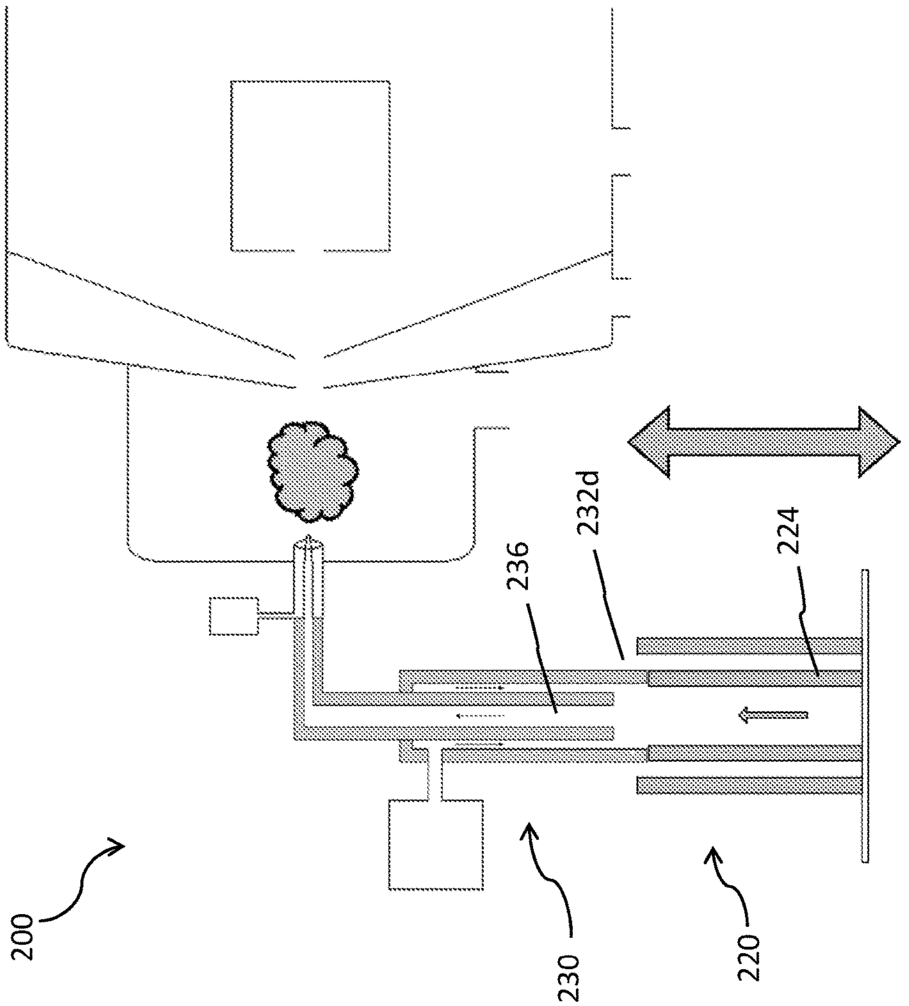
FIG. 2C, in a schematic diagram, illustrates the system of FIG. 2A in which the wash station is moved to a high flow rate flushing position.

As shown in FIGS. 2A-C, the system 200 also differs in that the wash station 220 is configured to not only initially immerse the open end of the sampling probe within a flowing washing solvent as shown in the position of FIG. 2B, but may also be configured to provide high flowrate flushing of the sampling probe 230. For example, after submerging the open end of the sampling probe 230 in the washing solvent so as to remove contaminants from the outer surfaces of the sampling probe as shown in FIG. 2B, the wash station 220 may be configured to further move relative to the sampling probe 230 so as to substantially seal against the open end 232*d* of the sampling probe 230 as shown in FIG. 2C. With the wash station 220 sealed against the open end 232*d* in this second position, the washing solvent provided by the wash station 220 is not directed to a waste reservoir as in FIG. 1A, but instead may be directed through the sampling probe 230 (e.g., the liquid exhaust conduit 236). By way of example, the inner housing 224 of the wash station 220 may selectively seal the sampling probe 230 via compression of the distal surface of the inner housing 224 or an O-ring against a surface of the sampling probe 230. In such aspects, the flow rate of the washing solvent provided by the wash station 220 and/or the flow rate of the capture liquid provided by the liquid supply conduit 238 may be increased after sealing to provide additional cleaning, for example, by clearing bubbles and/or dislodging blockages caused by precipitates within the sampling probe. For example, the flow rate of pumps under the control of a controller (not shown) may be adjusted to control the flow rate of washing solvent and/or capture liquid through the wash station 220 and sampling probe 230 to provide for increased flow rate washing, as desired. The wash station 220 may then be retracted following a washing/flushing cycle, for example, when ready again for open-port operation of the sampling probe 230.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

The invention claimed is:

1. A system for performing chemical analysis, comprising:

a sampling probe comprising:

an outer housing having an open end;

a liquid supply conduit within the housing, the liquid supply conduit extending from an inlet end configured to be fluidly coupled to a capture liquid supply source to an outlet end configured to deliver capture liquid to a sampling space at the open end of the housing, wherein the sampling space comprises a liquid-air interface for receiving a specimen within the capture liquid in the sample space; and a liquid exhaust conduit within the housing, the liquid exhaust conduit extending from an inlet end in fluid communication with said sampling space to an outlet end; and a wash station configured to be fluidly coupled to a washing solvent source, wherein the wash station is configured to receive at least the open end of the sampling probe such that, during operation, said open end remains submerged within the washing solvent provided by the washing solvent source while the capture liquid is flowing from the capture liquid supply source of the sampling probe, through the liquid supply conduit, through the sampling space, and to the liquid exhaust conduit.

2. The system of claim 1, wherein the outlet end of the liquid exhaust conduit is configured to fluidly couple to an ion source for discharging capture liquid received at the inlet end of the liquid exhaust conduit into an ionization chamber in fluid communication with a sampling orifice of a mass spectrometer.

3. The system of claim 1, wherein the washing solvent and the capture liquid comprise the same solvent.

4. The system of claim 1, wherein the washing solvent and the capture liquid comprise different solvents.

5. The system of claim 1, wherein the washing solvent comprises a combination of the capture liquid and formic acid, or wherein the washing solvent comprises one or more of water, methanol, and formic acid.

6. The system of claim 1, wherein the capture liquid comprises acetonitrile.

7. The system of claim 1, wherein the wash station is configured such that at least the open end of the sampling probe may be submerged within a flow of washing solvent.

8. The system of claim 7, wherein the washing solvent is configured to flow through the wash station in a direction substantially parallel to a central axis of the sampling probe.

9. The system of claim 1, wherein the wash station is configured to be disposed below the sampling probe during washing thereof.

10. The system of claim 1, wherein the sampling probe is configured to be dipped into the washing solvent.

11. The system of claim 1, further comprising an actuator configured to selectively move at least one of the wash station and the sampling probe relative to the other, and optionally wherein the actuator comprises a robotic arm.

12. A method for performing chemical analysis, comprising:

receiving a specimen within a capture liquid at an open end of a sampling probe, said sampling probe comprising:

an outer housing defining the open end;

a liquid supply conduit within the housing, the liquid supply conduit extending from an inlet end configured to be fluidly coupled to a capture liquid supply source to an outlet end configured to deliver the capture liquid to a sampling space at the open end of the housing, wherein the sampling space comprises a liquid-air interface for receiving the specimen; and a liquid exhaust conduit within the housing, the liquid exhaust conduit extending from an inlet end in fluid communication with said sampling space to an outlet end;

delivering the capture liquid from the sampling space to the outlet end of the liquid exhaust conduit; and submerging the open end of the sampling probe within a washing solvent in a wash station while the capture liquid is flowing from the capture liquid supply source of the sampling probe, through the liquid supply conduit, through the sampling space, and to the liquid exhaust conduit.

13. The method of claim 12, further comprising fluidly coupling the outlet end of the liquid exhaust conduit with a chemical analyzer.

14. The method of claim 12, further comprising:

transporting the capture fluid from the sampling space to an ion source via the liquid exhaust conduit; and discharging the capture liquid into an ionization chamber in fluid communication with a sampling orifice of a mass spectrometer.

15. The method of claim 12, wherein the washing solvent and the capture liquid comprise the same solvent.

16. The method of claim 12, wherein the washing solvent and the capture liquid comprise different solvents.

17. The method of claim 12, further comprising providing a flow of washing solvent within the wash station for submerging the open end of the sampling probe within the flow of washing solvent, and optionally wherein the washing solvent is configured to flow through the wash station in a direction substantially parallel to a central axis of the sampling probe.

18. The method of claim 12, wherein submerging the open end of the sampling probe comprises dipping the sampling probe into the washing solvent.

19. The method of claim 12, wherein the wash station is disposed below the sampling probe during washing thereof.

20. The method of claim 12, further comprising moving at least one of the wash station and the sampling probe relative to the other.

* * * * *